(12) United States Patent  
Zhou et al.

(10) Patent No.: US 9,101,035 B2  
(45) Date of Patent: Aug. 4, 2015

(54) LUMINESCENT ELEMENT, ITS PREPARATION METHOD THEREOF AND LUMINESCENE METHOD

(75) Inventors: Mingjie Zhou, Guangdong (CN); Wenbo Ma, Guangdong (CN); Yugang Liu, Guangdong (CN)

(73) Assignee: Ocean's King Lighting Science & Technology CO., LTD., Guangdong (CN)

( * ) Notice: Subject to any disclaimer, the term of this patent is extended or adjusted under 35 U.S.C. 154(b) by 764 days.

(21) Appl. No.: 13/392,384

(22) PCT Filed: Aug. 26, 2009

(86) PCT No.: PCT/CN2009/073515
§ 371 (c)(1),
(2), (4) Date: Feb. 24, 2012

(87) PCT Pub. No.: WO2011/022876
PCT Pub. Date: Mar. 3, 2011

(65) Prior Publication Data
US 2012/0146499 A1  Jun. 14, 2012

(51) Int. Cl.
*H01J 23/34* (2006.01)
*H05B 33/14* (2006.01)
*C03C 3/068* (2006.01)
(Continued)

(52) U.S. Cl.
CPC ............... *H05B 33/14* (2013.01); *C03C 3/068* (2013.01); *C03C 4/12* (2013.01); *C03C 17/09* (2013.01); *C09K 11/7787* (2013.01); *H01J 29/20* (2013.01); *H01J 29/24* (2013.01); *H01J 29/28* (2013.01);
(Continued)

(58) Field of Classification Search
USPC ................. 315/1; 313/483, 503, 493; 445/58; 428/450, 433, 336; 257/98; 252/301.4 F, 301.6 F
See application file for complete search history.

(56) References Cited

U.S. PATENT DOCUMENTS 5,122,671 A    6/1992  Buchanan et al.
5,779,825 A *  7/1998  Moon .......................... 148/513
(Continued)

FOREIGN PATENT DOCUMENTS

CN    1270381 A    10/2000
CN    1270382 A    10/2000
(Continued)

OTHER PUBLICATIONS

Extended European Search Report and Search Opinion received for EP Patent Application No. 09848608.7, mailed on May 17, 2013, 7 pages.

(Continued)

*Primary Examiner* — Lincoln Donovan
*Assistant Examiner* — Thomas Skibinski
(74) *Attorney, Agent, or Firm* — Morrison & Foerster LLP

(57) ABSTRACT

A luminescent element includes a luminescent substrate; and a metal layer with a metal microstructure formed on a surface of the luminescent substrate; wherein the luminescent substrate has a luminescent material with a chemical composition: $Y_2O_3$:Eu. A preparation method of a luminescent element and a luminescence method are also provided. The luminescent element has good luminescence homogeneity, high luminescence efficiency, good luminescence stability and simple structure, and can be used in luminescent device with ultrahigh brightness.

8 Claims, 4 Drawing Sheets

(51) Int. Cl.
C03C 4/12 (2006.01)
C03C 17/09 (2006.01)
C09K 11/77 (2006.01)
H01J 29/20 (2006.01)
H01J 29/24 (2006.01)
H01J 29/28 (2006.01)

(52) U.S. Cl.
CPC ......... C03C 2217/25 (2013.01); C03C 2218/15 (2013.01); H01J 2329/20 (2013.01)

(56) References Cited

U.S. PATENT DOCUMENTS

| | | | |
|---|---|---|---|
| 5,788,881 | A | 8/1998 | Chadha et al. |
| 5,851,317 | A | 12/1998 | Biner et al. |
| 6,465,946 | B1 | 10/2002 | Yoon et al. |
| 6,504,297 | B1 | 1/2003 | Heo et al. |
| 7,229,675 | B1 * | 6/2007 | Paderov et al. ............... 427/529 |
| 7,423,368 | B2 | 9/2008 | Miyamae et al. |
| 7,799,444 | B2 | 9/2010 | Peuchert et al. |
| 2001/0048966 | A1 | 12/2001 | Trumble et al. |
| 2002/0158569 | A1 | 10/2002 | Wakahara et al. |
| 2005/0146724 | A1 | 7/2005 | Malak |
| 2006/0181196 | A1 * | 8/2006 | Peuchert et al. ............... 313/501 |
| 2006/0192213 | A1 * | 8/2006 | Ohwada et al. ................. 257/79 |
| 2007/0013300 | A1 | 1/2007 | Takahashi et al. |
| 2007/0059901 | A1 | 3/2007 | Majumdar et al. |
| 2007/0090748 | A1 * | 4/2007 | Sasaguri ...................... 313/496 |
| 2007/0262699 | A1 | 11/2007 | Takahashi et al. |
| 2007/0290602 | A1 | 12/2007 | Hosotani et al. |
| 2009/0051268 | A1 * | 2/2009 | You et al. ...................... 313/503 |
| 2009/0117260 | A1 | 5/2009 | Ishii et al. |
| 2009/0135339 | A1 | 5/2009 | You et al. |
| 2012/0146500 | A1 | 6/2012 | Zhou et al. |
| 2012/0146501 | A1 | 6/2012 | Zhou et al. |
| 2012/0146502 | A1 | 6/2012 | Zhou et al. |
| 2012/0153821 | A1 | 6/2012 | Zhou et al. |

FOREIGN PATENT DOCUMENTS

| | | |
|---|---|---|
| CN | 1632052 A | 6/2005 |
| CN | 1745450 A | 3/2006 |
| CN | 1754408 A | 3/2006 |
| CN | 1769231 A | 5/2006 |
| CN | 1805105 A | 7/2006 |
| CN | 1962932 A | 5/2007 |
| CN | 101071751 A | 11/2007 |
| CN | 101442089 A | 5/2009 |
| EP | 0062993 A1 | 10/1982 |
| EP | 0992463 A1 | 4/2000 |
| EP | 1246262 A2 | 10/2002 |
| EP | 1589555 A1 | 10/2005 |
| EP | 1642869 A1 | 4/2006 |
| EP | 1695946 A2 | 8/2006 |
| GB | 2000173 A | 1/1979 |
| JP | 1-149888 A | 6/1989 |
| JP | 2-18841 A | 1/1990 |
| JP | 5-89800 A | 4/1993 |
| JP | 2000-109823 A | 4/2000 |
| JP | 2000-159543 A | 6/2000 |
| JP | 2000-290646 A | 10/2000 |
| JP | 2002-141000 A | 5/2002 |
| JP | 2004-88011 A | 3/2004 |
| JP | 2005-11701 A | 1/2005 |
| JP | 2005-54182 A | 3/2005 |
| JP | 2007-103052 A | 4/2007 |
| JP | 2007-153626 A | 6/2007 |
| WO | 03/058728 A1 | 7/2003 |

OTHER PUBLICATIONS

Extended European Search Report and Search Opinion received for EP Patent Application No. 09848610.3, mailed on Dec. 17, 2012, 4 pages.
Office Action received for Japanese Patent Application No. 2012-525839, mailed on May 7, 2013, 3 pages of official copy only.
International Search Report received for PCT Patent Application No. PCT/CN2009/073515, mailed on Jun. 3, 2010, 8 pages (4 pages of English Translation and 4 pages of PCT Search Report).
International Search Report received for PCT Patent Application No. PCT/CN2009/073517, mailed on Jun. 3, 2010, 10 pages (5 pages of English Translation and 5 pages of PCT Search Report).
International Search Report received for PCT Patent Application No. PCT/CN2009/073518, mailed on Jun. 3, 2010, 10 pages (5 pages of English Translation and 5 pages of PCT Search Report).
International Search Report received for PCT Patent Application No. PCT/CN2009/073520, mailed on Jun. 3, 2010, 10 pages (5 pages of English Translation and 5 pages of Search Report).
International Search Report received for PCT Patent Application No. PCT/CN2009/073522, mailed on Jan. 14, 2010, 8 pages (4 pages of English Translation and 4 pages of Search Report).
Hong et al., "Comparison of Dynamics of Eu3+ in Different Y2O3 Nanostructured Materials and with Sol-Gel Produced SiO2 Glass", Journal of Luminescence, vol. 83-84, 1999, pp. 393-398.
Psuja et al., "Fabrication, Luminescent Properties and Possible Photonics Application of Eu:Y2 O3 Nanoparticles", 2008 International Students and Young Scientists Workshop "Photonics and Microsystems", Jun. 20-22, 2008, pp. 68-72.
Yi et al., "Enhanced Luminescence of Pulsed-Laser-Deposited Y2O3:Eu3+ Thin-Film Phosphors by Li Doping", Applied Physics Letters, vol. 81, No. 18, Oct. 28, 2002, pp. 3344-3346.
Office Action received for European Patent Application No. 09848608.7, mailed on Sep. 9, 2013, 5 pages.
Office Action received for Japanese Patent Application No. 2012-525840, mailed on Sep. 3, 2013, 3 pages of Official Copy Only. See Statement Under 37 CFR § 1.98(a) (3).
Office Action received for Japanese Patent Application No. 2012-525838, mailed on Sep. 17, 2013, 4 pages of Official Copy Only. See Statement Under 37 CFR § 1.98(a) (3).
Office Action received for Japanese Patent Application No. 2012-525835, mailed on Dec. 3, 2013, 3 pages of Official Copy Only. See Statement Under 37 CFR § 1.98(a) (3).
Office Action received for Chinese Patent Application No. 200980161087.8, issued on Aug. 14, 2013, 4 pages of Official Copy Only. See Statement Under 37 CFR § 1.98(a) (3).
Office Action received for Chinese Patent Application No. 200980161088.2, issued on Aug. 27, 2013, 5 pages of Official Copy Only. See Statement Under 37 CFR § 1.98(a) (3).
Office Action received for Chinese Patent Application No. 200980161090.X, issued on Sep. 29, 2013, 7 pages of Official Copy Only. See Statement Under 37 CFR § 1.98(a) (3).
Nagakura, Shigeru, "Metal Back Plate Fluorescence", Crystallographic Society of Japan Journal, vol. 23, 1981, pp. 299-301(Official Language Copy). See Statement Under 37 CFR § 1.98(a) (3).
Aisaka et al., "Enhancement of Upconversion Luminescence of Er Doped AL2O3 Films by Ag Island Films", Applied Physics Letters, vol. 92, 2008, pp. 132105-1-132105-3.
International Preliminary Report on Patentability received for PCT Patent Application No. PCT/CN2009/073515, mailed on Mar. 8, 2012, 8 pages (5 pages of English Translation and 3 pages of IPRP).
International Preliminary Report on Patentability received for PCT Patent Application No. PCT/CN2009/073517, mailed on Mar. 8, 2012, 12 pages (7 pages of English Translation and 5 pages of IPRP).
International Preliminary Report on Patentability received for PCT Patent Application No. PCT/CN2009/073518, mailed on Mar. 8, 2012, 12 pages (7 pages of English Translation and 5 pages of IPRP).
International Preliminary Report on Patentability received for PCT Patent Application No. PCT/CN2009/073520, mailed on Mar. 8, 2012, 12 pages (7 pages of English Translation and 5 pages of IPRP).
International Preliminary Report on Patentability received for PCT Patent Application No. PCT/CN2009/073522, mailed on Mar. 8, 2012, 10 pages (6 pages of English Translation and 4 pages of IPRP).
Office Action received for Japanese Patent Application No. 2012-525837, mailed on Dec. 3, 2013, 3 pages of Official copy only. See Statement Under 37 CFR § 1.98(a) (3).

(56) References Cited

OTHER PUBLICATIONS

Office Action received for Chinese Patent Application No. 200980161086.3, mailed on Aug. 2, 2013, 4 pages of Official copy only. See Statement Under 37 CFR § 1.98(a) (3).
Extended European Search Report (includes Supplementary European Search Report and Search Opinion) received for European Patent Application No. 09848611.1, mailed on Jun. 2, 2014, 11 pages.
Extended European Search Report (includes Supplementary European Search Report and Search Opinion) received for European Patent Application No. 09848612.9, mailed on Jun. 18, 2014, 10 pages.
Extended European Search Report (includes Supplementary European Search Report and Search Opinion) received for European Patent Application No. 09848613.7, mailed on Jun. 17, 2014, 8 pages.
Non-Final Office Action received for U.S. Appl. No. 13/392,398, mailed on Dec. 24, 2014, 8 pages.
Non-Final Office Action received for U.S. Appl. No. 13/392,407, mailed on Dec. 26, 2014, 9 pages.
Non-Final Office Action received for U.S. Appl. No. 13/392,420, mailed on Dec. 31, 2014, 10 pages.
Non Final Office Action received for U.S. Appl. No. 13/392,449, mailed on Jan. 28, 2015, 11 pages.
Ehrt, D., "Structure, Properties and Applications of Borate Glasses", Glass Technology, vol. 41, No. 6, Dec. 2000, pp. 182-185.
Sohn et al., "Luminescence of Pulsed Laser Deposited Y2SiO5:Tb3+ Thin Film Phosphors on Fiat and Corrugated Quartz Glass Substrates", Japanese Journal of Applied Physics, vol. 44, No. 4A, 2005, pp. 1787-1791.

* cited by examiner

LUMINESCENT ELEMENT, ITS PREPARATION METHOD THEREOF AND LUMINESCENE METHOD

CROSS REFERENCE TO RELATED APPLICATIONS

This application is a national stage of International Patent Application Serial No. PCT/CN2009/073515, filed Aug. 26, 2009, which is hereby incorporated by reference in the present disclosure in its entirety.

FIELD OF THE INVENTION

The present disclosure relates to luminescent materials, and more particularly relates to a luminescent element including a glass substrate made of luminescent material, its preparation method thereof and luminescence method.

BACKGROUND OF THE INVENTION

The conventional materials used as luminescent substrate include phosphor, nanocrystal, glass and so on. Compared with the crystal and phosphor, the glass has advantages of transparent, rigid, excellent chemical stability and superior luminescent property. In addition, the glass can be easily manufactured into products with various shapes, such as display devices or light sources with various shapes and sizes.

For example, in vacuum microelectronics, field emission devices usually use luminescent substrate as illuminant, which has shown a wide prospect in illumination and display techniques and draws a lot attention to domestic and foreign research institutes. The working principle of the field emission device is that, in vacuum, the anode supplies a positive voltage to the field emissive arrays (FEAs) to form an accelerating electric field. Electron emitted from the cathode is accelerated to bombard the luminescent material on the anode plate to make it irradiation. The field emission device has a wide operating temperature range (−40° C.-80° C.), short corresponding time (<1 ms), simple structure, low energy consumption, and meets the environmental protection requirements. Furthermore, materials such as the phosphor, luminescent substrate, luminescent film can be served as luminescent materials in field emission device, however, they all suffer from serious problems of low luminous efficiency, which significantly limit the application of the field emission device, especially in the application of illumination.

SUMMARY OF THE INVENTION

In one aspect of the present disclosure, a luminescent element with high luminescent homogeneity, high luminous efficiency, good stability, simple structure and a preparation method with simple processes and low cost are desired.

In another aspect of the present disclosure, a luminescence method of the luminescent element with simple operation, good reliability, and improving luminous efficiency is also desired.

A luminescent element includes: a luminescent substrate; and a metal layer with a metal microstructure formed on a surface of the luminescent substrate; wherein the luminescent substrate includes a luminescent material with a chemical composition: $Y_2O_3$:Eu.

A preparation method of a luminescent element includes the following steps:

preparing a luminescent substrate including a luminescent material with a chemical composition: $Y_2O_3$:Eu;

forming a metal layer on the luminescent substrate;

annealing the luminescent substrate and the metal layer in vacuum to form a metal microstructure of the metal layer, and then cooling the luminescent substrate and the metal layer to form the luminescent element.

A luminescence method of a luminescent element includes the following steps:

obtaining the luminescent element according to the preparation method described above; and emitting cathode-ray to the metal layer, forming a surface plasmon between the metal layer and the luminescent substrate by the radiation of the cathode-ray and then irradiating the luminescent substrate.

In the luminescent element described above, the metal layer with the metal microstructure is formed on the surface of the luminescent substrate and irradiated by the cathode-ray, the surface plasmon is thus generated between the metal layer and the luminescent substrate. Due to the surface plasmon effect, the internal quantum efficiency of the luminescent substrate is highly increased, and the spontaneous emission of the luminescent substrate is highly increased, so that the luminous efficiency of the luminescent substrate is improved and the low efficiency problem of the luminescent materials is overcomed. Accordingly, in the luminescence method of the luminescent element, once emitting cathode-ray to the metal layer, the surface plasmon will be formed between the metal layer and the luminescent substrate, thus the luminous efficiency and reliability are improved. The luminescent element has a simple two-layers structure including the luminescent substrate and the metal layer. In addition, there is a uniform interface formed between the luminescent substrate and the metal layer, so that an excellent luminescent homogeneity and stability are achieved. In the luminescence method of the luminescent element, once emitting cathode-ray to the metal layer, the surface plasmon will be formed between the metal layer and the luminescent substrate, thus improving the luminous efficiency and reliability of the luminescent substrate.

In the embodiment of the preparation method of the luminescent element, the luminescent element can be obtained by forming a metal layer on the luminescent substrate and annealing the luminescent substrate and the metal layer, thus the preparation method is simple and low cost. The luminescent element has a wide production and application prospect.

BRIEF DESCRIPTION OF THE DRAWINGS

The components in the drawings are not necessarily drawn to scale, the emphasis instead being placed upon clearly illustrating the principles of the present disclosure.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
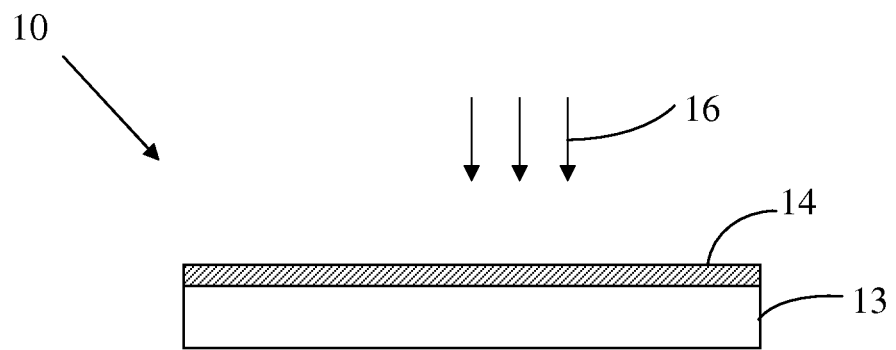
FIG. 1 is a schematic drawing of a luminescent element according to an embodiment of the present disclosure.

Referring to FIG. 1, an embodiment of a luminescent element 10 including a luminescent substrate 13 and a metal layer 14 formed on a surface of the luminescent substrate 13 is shown. The metal layer 14 has a metal microstructure which may be also called as micro-nano structure. In addition, the metal microstructure is aperiodic, i.e. composed of metal crystal in irregular arrangement.

In the embodiment of the present disclosure, the luminescent substrate 13 is a luminescent glass doped with a luminescent material $Y_2O_3$:Eu. Wherein the chemical composition of the luminescent glass is $20Na_2O$-$20BaO$-$30B_2O_3$-$30SiO_2$, and the glass is preferred made of glass powder with low melting point, and the glass is not limited to the glass material described here. The mass percentage of the luminescent material $Y_2O_3$:Eu in the luminescent substrate is in a range of 5%-35%.

In another embodiment of the present disclosure, the luminescent substrate 13 includes a transparent or semitransparent substrate and a luminescent film with a chemical composition of $Y_2O_3$:Eu formed on the substrate. The metal layer 14 is formed on a surface of the luminescent film.

Wherein the metal layer 14 may be made of metals with excellent chemical stability, such as antioxidant and corrosion-resistant metals, or common metals. The metal layer 14 is preferably made of at least one metal selected from the group consisting of Au, Ag, Al, Cu, Ti, Fe, Ni, Co, Cr, Pt, Pd, Mg, and Zn, and more preferably made of at least one metal selected from the group consisting of Au, Ag, and Al. The metal layer 14 may be made of a metal monomer or a composite metal. The composite metal may be an alloy of two or more than two metals described above. For example, the metal layer 14 may be an Ag/Al alloy layer or an Au/Al alloy layer, wherein the mass percentage of Ag or Au is preferably more than 70%. The metal layer 14 has a thickness range of 0.5-200 nm, preferably 1-100 nm.

As a luminescent element, the luminescent element 10 can be widely applied to luminescent devices with ultra-high brightness and high-speed motion, such as field emission display, field emission light source, and large advertising display and so on. Taking field emission display as an example, the anode applies a positive voltage to the field emission cathode to form an accelerating electric field, the cathode emits electron, i.e. cathode-ray 16 to the metal layer 14, such that a surface plasmon is formed between the metal layer 14 and the luminescent substrate 13. Due to the surface plasmon effect, the internal quantum efficiency of the luminescent substrate 13 is highly increased, and the spontaneous emission of the luminescent substrate is highly increased, such that the luminous efficiency of the luminescent substrate is improved and the low efficiency problem of the luminescent materials is overcome. In addition, since a metal layer is formed on the surface of the luminescent substrate 13, a uniform interface is formed between the whole metal layer and the luminescent substrate 13, thus the luminescent homogeneity is improved.

Figure 2:
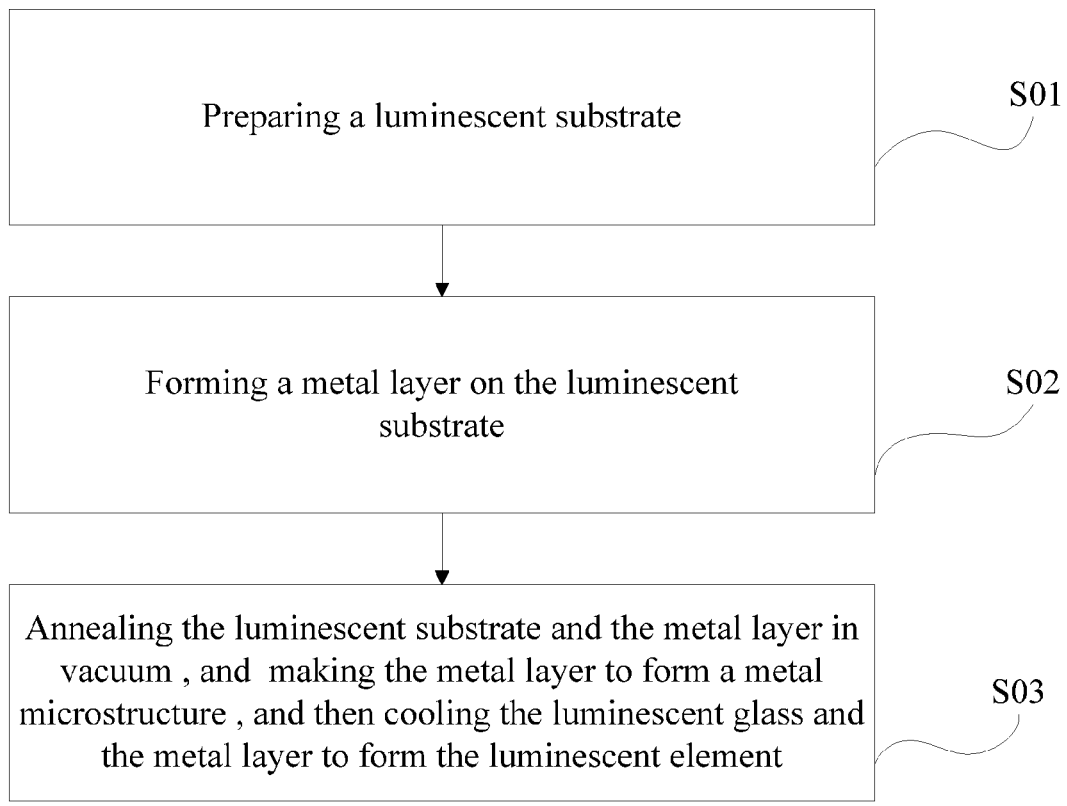
FIG. 2 is a flowchart of an embodiment of a preparation method of a luminescent element.

Referring to FIG. 1 and FIG. 2, a flow chart of an embodiment of a preparation method of a luminescent element is shown and the method includes following steps:

Step S01, a luminescent substrate 13 including a luminescent material with a chemical composition $Y_2O_3$:Eu is prepared;

Step S02, a metal layer 14 is formed on a surface of the luminescent substrate 13; and Step S03, the luminescent substrate 13 and the metal layer 14 are annealed in vacuum to form the metal microstructure of the metal layer 14, and then the luminescent substrate 13 and the metal layer 14 are cooled to form the luminescent element.

In step S01, according to the two structures of the luminescent substrate 13 described above: one is the luminescent glass doped with the luminescent material $Y_2O_3$:Eu and another is the luminescent film $Y_2O_3$:Eu formed on the substrate, there are two different methods. The preparation method of the former luminescent substrate 13 includes following steps: the luminescent material $Y_2O_3$:Eu and the glass powder are mixed and melted at 1000-1300° C., then they are cooled to the room temperature and thus the luminescent glass doped with the luminescent material $Y_2O_3$:Eu is obtained. Wherein the chemical composition of the glass powder are $20Na_2O$-$20BaO$-$30B_2O_3$-$30SiO_2$ and the luminescent material $Y_2O_3$:Eu which is also powder is mixed with the glass powder according to the mass proportion of 1:19-7:13. The mass percentage of the mixed luminescent material $Y_2O_3$:Eu in the mixture is in a range of 5%-35%. The mixture is melted at 1000-1300° C., poured on a steel plate and then cooled to the room temperature, and the substrate 13 is thus obtained. The temperature used to melt the mixture is preferably 1200° C.

The preparation method of the latter luminescent substrate 13 includes following steps: a transparent or semitransparent substrate as a substrate is selected and the luminescent film $Y_2O_3$:Eu is deposited on the substrate. Wherein The luminescent film $Y_2O_3$:Eu is deposited and formed on the substrate using methods such as magnetron sputtering, electron beam evaporation, CVD, MBE, PLD or spray pyrolysis and so on.

As previously described, the metal layer 14 is formed by depositing metal source with excellent chemical stability, such as antioxidant and corrosion-resistant metals, or common metals. The metal layer 14 is preferably made of at least one metal selected from the group consisting of Au, Ag, Al, Cu, Ti, Fe, Ni, Co, Cr, Pt, Pd, Mg, and Zn, and more preferably made of at least one metal selected from the group consisting of Au, Ag, and Al. In step S02, the metal layer 14 is formed on the surface of the luminescent substrate 13 via PVD or CVD using at least one metal described above, for example, via sputtering or evaporation while not limited to the two technologies. The thickness of the metal layer 14 is preferably in a range of 0.5-200 nm, and more preferably in a range of 1-100 nm.

In step S03, after the formation of the metal layer 14 on the luminescent substrate 13, the metal layer 14 and the luminescent substrate 13 are annealed at 50-650° C. for 5 minutes to 5 hours and then cooled to the room temperature. The preferred anneal temperature is in a range of 100-500° C., and the preferred anneal time is in a range of 15 minutes to 3 hours.

Figure 3:
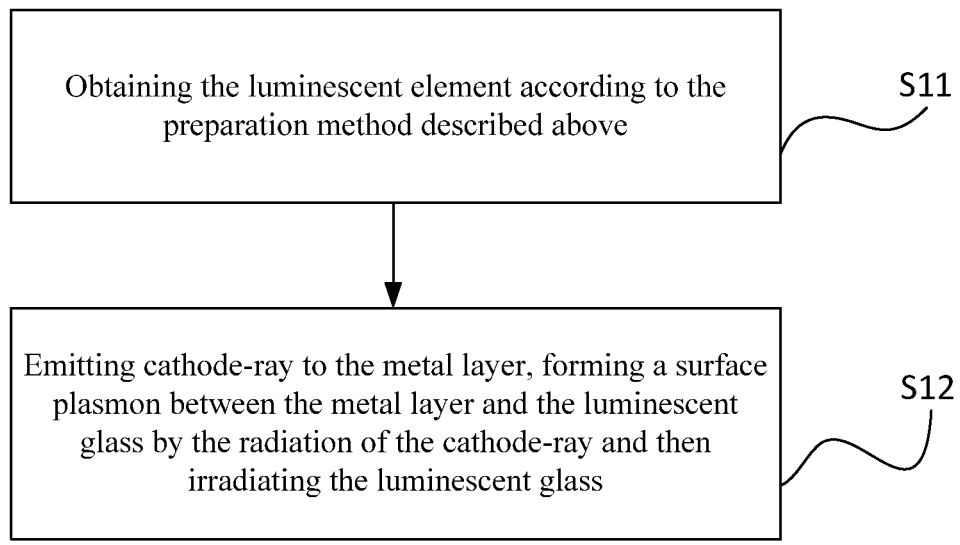
FIG. 3 is a flowchart of an embodiment of a luminescence method using the luminescent element.

Referring to FIG. 1 and FIG. 3, a flow chart of a luminescence method of the luminescent element is shown and the method includes following steps:

Step S11, the luminescent element 10 is obtained according to the previously described preparation method.

Step S12, cathode-ray 16 is emitted to the metal layer 14. A surface plasmon is formed between the metal layer 14 and the luminescent substrate 13 by the radiation of the cathode-ray 16 and thus the luminescent substrate 13 is irradiated.

The luminescent element 10 has features of structure and composition as previously described. In application, the step S12 can be implemented by field emission display or illumination light source. In vacuum, the anode applies a positive voltage to the field emission cathode to form an accelerating electric field, such that the cathode emits cathode-ray 16.

Excited by the cathode-ray 16, electron beam will penetrate the metal layer 14 and irradiate the luminescent substrate 13. During such process, the surface plasmon is formed between the metal layer 14 and the luminescent substrate 13. Due to the surface plasmon effect, the internal quantum efficiency of the luminescent substrate 13 is highly increased, and the spontaneous emission of the luminescent substrate is highly increased, such that the luminous efficiency of the luminescent substrate is improved.

The luminescent substrate 13 has two structures as described above. In the former structure, the electron beam penetrates the metal layer 14 and then the luminescent material $Y_2O_3$:Eu doped in the luminescent glass is excited to illuminate. The luminescent material $Y_2O_3$:Eu is excited to illuminate by the surface plasmon which is formed between the surface of the luminescent glass doped with the luminescent material $Y_2O_3$:Eu and the metal layer 14. In the latter structure, the electron beam penetrates the metal layer 14 and directly excite the luminescent film $Y_2O_3$:Eu to illuminate. The luminescent material $Y_2O_3$:Eu is excited to illuminate by the surface plasmon which is formed between the luminescent film $Y_2O_3$:Eu and the metal layer 14.

Surface plasmon (short for SP) is a wave spread along the interface between the metal and medium, whose amplitude exponentially decay with the increase of the distance away from the interface. When changing a surface structure of the metal, the feature, dispersion relationship, excitation mode, coupling effect of the surface plasmon polaritons (hereafter may referred to as SPPs) will be significantly changed. The electromagnetic field caused by the SPPs can not only constrain the spread of the light wave in sub-wavelength size structure, but also can produce and manipulate the electromagnetic radiation from light frequency to microwave band, thus active manipulation of the light spread is implemented. Accordingly, the present embodiment uses the excitation of the SPPs to increase the optical density of the luminescent substrate and to enhance spontaneous emission velocity of the luminescent substrate. In addition, the coupling effect of the surface plasmon can be used, when the luminescent substrate irradiates, sympathetic vibration phenomena occurs, thus the internal quantum efficiency of the luminescent substrate is highly increased, such that the luminous efficiency of the luminescent substrate is improved.

A plurality of examples are described to illustrate the different compositions and preparation methods of the luminescent element, and their performances.

EXAMPLE 1

A phosphor with chemical composition $Y_2O_3$:Eu and a glass powder (the chemical composition of the glass powder are $20Na_2O$-$20BaO$-$30B_2O_3$-$30SiO_2$) are mixed according to the mass proportion of 1:4 and then melted to prepare a luminescent glass doped with a luminescent material $Y_2O_3$:Eu. A Ag layer is deposited on a surface of the luminescent glass with thickness of 2 nm using a magnetron sputtering equipment, and then the Ag layer together with the luminescent glass are introduced in a vacuum environment with vacuum degree less than $1\times10^{-3}$ Pa, annealed at 300° C. for 30 minutes and cooled to the room temperature to obtain a luminescent element of this embodiment.

Figure 4:
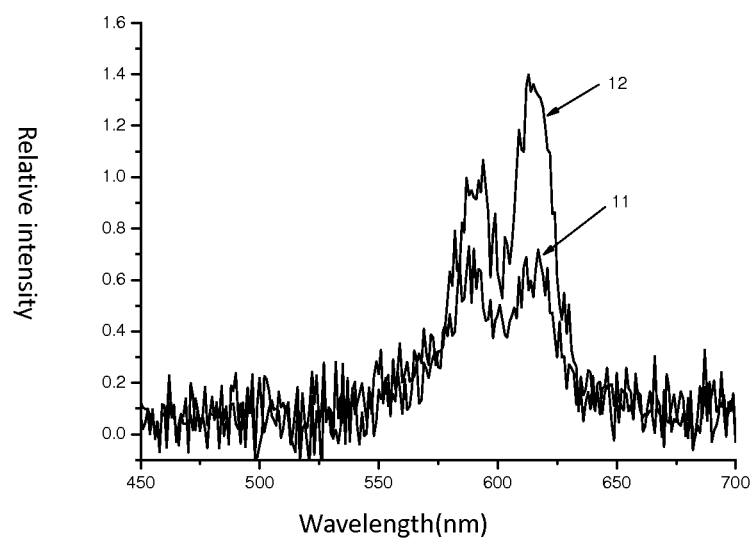
FIG. 4 is an emission spectrum of the luminescent element of Example 1 compared with the luminescent substrate without the metal layer. The emission spectrum of the cathode-ray is tested when excited by the electron beam with 5 KV accelerating voltage.

A emission spectrum according to FIG. 4 is obtained when testing the emission spectrum of the luminescent element by bombarding the luminescent element using a cathode-ray generated by a electron gun which firstly penetrates the metal layer and then excites the luminescent glass doped with $Y_2O_3$:Eu to illuminate. The spectrum according to FIG. 4 shows that the luminescent material has the ability to emit red light. The curve 11 in FIG. 4 represents the emission spectrum of a luminescent glass without the Ag layer, and the curve 12 represents the emission spectrum of the luminescent glass added with metal structure of this embodiment. According to FIG. 4, due to the surface plasmon effect yield between the metal layer and the luminescent glass, when compared with the luminescent glass without the metal layer, the lighting integral intensity from 350 nm to 700 nm of the luminescent glass added with metal structure is 1.3 times than the luminescent glass without metal layer, that is the illuminant property of the luminescent glass is thus improved.

Other Examples have the similar emission spectrums and luminescent performance as Example 1, which will not be described later.

EXAMPLE 2

A phosphor with chemical composition $Y_2O_3$:Eu and a glass powder (the chemical composition of the glass powder are $20Na_2O$-$20BaO$-$30B_2O_3$-$30SiO_2$) are mixed according to the mass proportion of 1:19 and then melted to prepare a luminescent glass doped with a luminescent material $Y_2O_3$:Eu. A Au layer is deposited on a surface of the luminescent glass with thickness of 0.5 nm using a magnetron sputtering equipment, and then the Au layer together with the luminescent glass are introduced in a vacuum environment with vacuum degree less than $1\times10^{-3}$ Pa, annealed at 200° C. for 1 hour and cooled to the room temperature to obtain a luminescent element of this embodiment.

EXAMPLE 3

A phosphor with chemical composition $Y_2O_3$:Eu and a glass powder (the chemical composition of the glass powder are $20Na_2O$-$20BaO$-$30B_2O_3$-$30SiO_2$) are mixed according to the mass proportion of 7:13 and then melted to prepare a luminescent glass doped with a luminescent material $Y_2O_3$:Eu. A Al layer is deposited on the surface of the luminescent glass with thickness of 200 nm using a magnetron sputtering equipment, and then the Al layer together with the luminescent glass are introduced in a vacuum environment with vacuum degree less than $1\times10^{-3}$ Pa, annealed at 500° C. for 5 hours and cooled to the room temperature to obtain a luminescent element of this embodiment.

EXAMPLE 4

A $1\times1$ cm$^2$, double-faces polished sapphire substrate is selected. A luminescent film with chemical composition $Y_2O_3$:Eu is formed on the substrate using magnetron sputtering technology. A Mg layer with thickness of 100 nm is deposited on the luminescent film using electron beam evaporation equipment and the Mg layer together with the substrate and the luminescent film are introduced in a vacuum environment with vacuum degree less than $1\times10^{-3}$ Pa, annealed at 650° C. for 5 minutes and cooled to the room temperature to obtain a luminescent element of this embodiment.

EXAMPLE 5

A $1\times1$ cm$^2$, double-faces polished MgO substrate is selected. A luminescent film with chemical composition $Y_2O_3$:Eu is formed on the substrate using MBE technology. A Pd layer with thickness of 1 nm is deposited on the luminescent film using electron beam evaporation equipment and the Pd layer together with the substrate and the luminescent film are introduced in a vacuum environment with vacuum degree less than $1\times10^{-3}$ Pa, annealed at 100° C. for 3 hours and cooled to the room temperature to obtain a luminescent element of this embodiment.

EXAMPLE 6

A $1\times1$ cm$^2$, double-faces polished MgO substrate is selected. A luminescent film with chemical composition Y$_2$O$_3$:Eu is formed on the substrate using spray pyrolysis technology. A Pt layer with thickness of 5 nm is deposited on the luminescent film using electron beam evaporation equipment and the Pt layer together with the substrate and the luminescent film are introduced in a vacuum environment with vacuum degree less than $1\times10^{-3}$ Pa, annealed at 450° C. for 15 minutes and cooled to the room temperature to obtain a luminescent element of this embodiment.

EXAMPLE 7

A $1\times1$ cm$^2$, double-faces polished quartz substrate is selected. A luminescent film with chemical composition Y$_2$O$_3$:Eu is formed on the substrate using magnetron sputtering technology. A Fe layer with thickness of 20 nm is deposited on the luminescent film using electron beam evaporation equipment and the Fe layer together with the substrate and the luminescent film are introduced in a vacuum environment with vacuum degree less than $1\times10^{-3}$ Pa, annealed at 50° C. for 5 hours and cooled to the room temperature to obtain a luminescent element of this embodiment.

EXAMPLE 8

A $1\times1$ cm$^2$, double-faces polished quartz substrate is selected. A luminescent film with chemical composition Y$_2$O$_3$:Eu is formed on the substrate using magnetron sputtering technology. A Ti layer with thickness of 10 nm is deposited on the luminescent film using electron beam evaporation equipment and the Ti layer together with the substrate and the luminescent film are introduced in a vacuum environment with vacuum degree less than $1\times10^{-3}$ Pa, annealed at 150° C. for 2 hours and cooled to the room temperature to obtain a luminescent element of this embodiment.

EXAMPLE 9

A $1\times1$ cm$^2$, double-faces polished quartz substrate is selected. A luminescent film with chemical composition Y$_2$O$_3$:Eu is formed on the substrate using magnetron sputtering technology. A Cu layer with thickness of 50 nm is deposited on the luminescent film using electron beam evaporation equipment and the Cu layer together with the substrate and the luminescent film are introduced in a vacuum environment with vacuum degree less than $1\times10^{-3}$ Pa, annealed at 200° C. for 2.5 hours and cooled to the room temperature to obtain a luminescent element of this embodiment.

EXAMPLE 10

A $1\times1$ cm$^2$, double-faces polished quartz substrate is selected. A luminescent film with chemical composition Y$_2$O$_3$:Eu is formed on the substrate using magnetron sputtering technology. A Zn layer with thickness of 150 nm is deposited on the luminescent film using electron beam evaporation equipment and the Zn layer together with the substrate and the luminescent film are introduced in a vacuum environment with vacuum degree less than $1\times10^{-3}$ Pa, annealed at 350° C. for 30 minutes and cooled to the room temperature to obtain a luminescent element of this embodiment.

EXAMPLE 11

A $1\times1$ cm$^2$, double-faces polished quartz substrate is selected. A luminescent film with chemical composition Y$_2$O$_3$:Eu is formed on the substrate using magnetron sputtering technology. A Cr layer with thickness of 120 nm is deposited on the luminescent film using electron beam evaporation equipment and the Cr layer together with the substrate and the luminescent film are introduced in a vacuum environment with vacuum degree less than $1\times10^{-3}$ Pa, annealed at 250° C. for 2 hours and cooled to the room temperature to obtain a luminescent element of this embodiment.

EXAMPLE 12

A $1\times1$ cm$^2$, double-faces polished quartz substrate is selected. A luminescent film with chemical composition Y$_2$O$_3$:Eu is formed on the substrate using magnetron sputtering technology. A Ni layer with thickness of 40 nm is deposited on the luminescent film using electron beam evaporation equipment and the Ni layer together with the substrate and the luminescent film are introduced in a vacuum environment with vacuum degree less than $1\times10^{-3}$ Pa, annealed at 80° C. for 4 hours and cooled to the room temperature to obtain a luminescent element of this embodiment.

EXAMPLE 13

A $1\times1$ cm$^2$, double-faces polished quartz substrate is selected. A luminescent film with chemical composition Y$_2$O$_3$:Eu is formed on the substrate using magnetron sputtering technology. A Co layer with thickness of 180 nm is deposited on the luminescent film using electron beam evaporation equipment and the Co layer together with the substrate and the luminescent film are introduced in a vacuum environment with vacuum degree less than $1\times10^{-3}$ Pa, annealed at 400° C. for 1 hour and cooled to the room temperature to obtain a luminescent element of this embodiment.

EXAMPLE 14

A phosphor with chemical composition Y$_2$O$_3$:Eu and a glass powder (the chemical composition of the glass powder are 20Na$_2$O-20BaO-30B$_2$O$_3$-30SiO$_2$) are mixed according to the mass proportion of 3:17 and then melted to prepare a luminescent glass doped with a luminescent material Y$_2$O$_3$:Eu. A Au/Al layer is deposited on a surface of the luminescent glass with thickness of 0.5 nm using a magnetron sputtering equipment, and then the Au/Al layer together with the luminescent glass are introduced in a vacuum environment with vacuum degree less than $1\times10^{-3}$ Pa, annealed at 200° C. for 1 hour and cooled to the room temperature to obtain a luminescent element of this embodiment. Wherein the mass percentage of the Au and the Al in the Au/Al layer are 80% and 20% respectively.

EXAMPLE 15

A phosphor with chemical composition Y$_2$O$_3$:Eu and a glass powder (the chemical composition of the glass powder are 20Na$_2$O-20BaO-30B$_2$O$_3$-30SiO$_2$) are mixed according to the mass proportion of 3:7 and then melted to prepare a luminescent glass doped with a luminescent material Y$_2$O$_3$:Eu. A Ag/Al layer is deposited on a surface of the luminescent glass with thickness of 15 nm using a magnetron sputtering equipment, and then the Ag/Al layer together with the luminescent glass are introduced in a vacuum environment with vacuum degree less than $1\times10^{-3}$ Pa, annealed at 200° C. for 1 hour and cooled to the room temperature to obtain a luminescent element of this embodiment. Wherein the mass percentage of the Ag and the Al in the Ag/Al layer are 90% and 10% respectively.

EXAMPLE 16

A $1\times1$ cm$^2$, double-faces polished quartz substrate is selected. A luminescent film with chemical composition $Y_2O_3$:Eu is formed on the substrate using magnetron sputtering technology. A Ag/Al layer with thickness of 10 nm is deposited on the luminescent film using electron beam evaporation equipment and the Ag/Al layer together with the substrate and the luminescent film are introduced in a vacuum environment with vacuum degree less than $1\times10^{-3}$ Pa, annealed at 150° C. for 2 hours and cooled to the room temperature to obtain a luminescent element of this embodiment. Wherein the mass percentage of the Ag and the Al in the Ag/Al layer are 80% and 20% respectively.

EXAMPLE 17

A $1\times1$ cm$^2$, double-faces polished MgO substrate is selected. A luminescent film with chemical composition $Y_2O_3$:Eu is formed on the substrate using magnetron sputtering technology. A Au/Al layer with thickness of 10 nm is deposited on the luminescent film using electron beam evaporation equipment and the Au/Al layer together with the substrate and the luminescent film are introduced in a vacuum environment with vacuum degree less than $1\times10^{-3}$ Pa, annealed at 150° C. for 2 hours and cooled to the room temperature to obtain a luminescent element of this embodiment. Wherein the mass percentage of the Au and the Al in the Au/Al layer are 90% and 10% respectively.

In Examples described above, the metal layer 14 with the metal microstructure is formed on the surface of the luminescent substrate 13, and irradiated by the cathode-ray, such that the surface plasmon can be formed between the metal layer 14 and the luminescent substrate 13. Due to the surface plasmon effect, the internal quantum efficiency of the luminescent substrate 13 is highly increased, and the spontaneous emission of the luminescent substrate is highly increased, such that the luminous efficiency of the luminescent substrate is improved and the problem of low efficiency of the luminescent materials is overcome. In the luminescence method of the luminescent element, once emitting cathode-ray to the metal layer 14, the surface plasmon will be formed between the metal layer 14 and the luminescent substrate 13, thus the luminous efficiency and reliability are improved. The luminescent element 10 has a simple two-layers structure which includes the luminescent substrate 13 and the metal layer 14. In addition, there is a uniform interface formed between the luminescent substrate 13 and the metal layer 14, such that an excellent luminescent homogeneity and stability are achieved. In a luminescence method using the luminescent element, once emitting cathode-ray to the metal layer 14, the surface plasmon will be formed between the metal layer 14 and the luminescent substrate 13, thus the luminous efficiency and reliability of the luminescent substrate 13 are improved.

In the embodiment of the preparation method of the luminescent element, the luminescent element can be obtained by forming a metal layer on the luminescent substrate and annealing the luminescent substrate and the metal layer, thus the preparation method is simple and low cost. The luminescent element can be widely applied to luminescent devices with ultra-high brightness and high-speed motion, such as field emission display.

Although the invention has been described in language specific to structural features and/or methodological acts, it is to be understood that the invention defined in the appended claims is not necessarily limited to the specific features or acts described. Rather, the specific features and acts are disclosed as sample forms of implementing the claimed invention.

What is claimed is:

1. A luminescent element, comprising:

a luminescent substrate; and a metal layer with a metal microstructure formed on a surface of the luminescent substrate, wherein the luminescent substrate comprises a luminescent material with a chemical composition: $Y_2O_3$:Eu, wherein the luminescent substrate is a luminescent glass doped with the luminescent material of $Y_2O_3$:Eu, and wherein the chemical composition of the luminescent glass is $20Na_2O$-$20BaO$-$30B_2O_3$-$30SiO_2$.

2. The luminescent element according to claim 1, wherein the mass percentage of the luminescent material of $Y_2O_3$:Eu in the luminescent substrate is in a range of 5%-35%.

3. The luminescent element according to claim 1, wherein the luminescent substrate comprises a transparent or semitransparent substrate and a luminescent film formed on the transparent or semitransparent substrate with the chemical composition $Y_2O_3$:Eu, and the metal layer is formed on a surface of the luminescent film.

4. The luminescent element according to claim 1, wherein the material of the metal layer is at least one metal selected from the group consisting of Au, Ag, Al, Cu, Ti, Fe, Ni, Co, Cr, Pt, Pd, Mg and Zn.

5. The luminescent element according to claim 1, wherein the metal layer has a thickness range of 0.5-200 nm.

6. A luminescence method of a luminescent element, comprising:

preparing a luminescent substrate, wherein the luminescent substrate comprises a luminescent material with a chemical composition: $Y_2O_3$:Eu;

forming a metal layer on the surface of the luminescent substrate;

annealing the luminescent substrate and the metal layer in vacuum to form a metal microstructure of the metal layer;

cooling the luminescent substrate and the metal layer to form the luminescent element;

emitting cathode-ray to the metal layer;

forming a surface plasmon between the metal layer and the luminescent substrate by the radiation of the cathode-ray; and irradiating the luminescent substrate.

7. The luminescence method of claim 6, wherein the preparation of the luminescent substrate comprises:

mixing the luminescent material $Y_2O_3$:Eu and glass powder and melting at 1000-1300° C. to form a mixture; and cooling the mixture to the room temperature to form a luminescent glass doped with the luminescent material $Y_2O_3$:Eu.

8. The luminescence method of claim 6, wherein the preparation of the luminescent substrate comprises:
   selecting a transparent or semitransparent substrate as a substrate; and
   forming a luminescent film with the chemical composition $Y_2O_3$:Eu on the substrate.

* * * * *